UNITED STATES PATENT OFFICE.

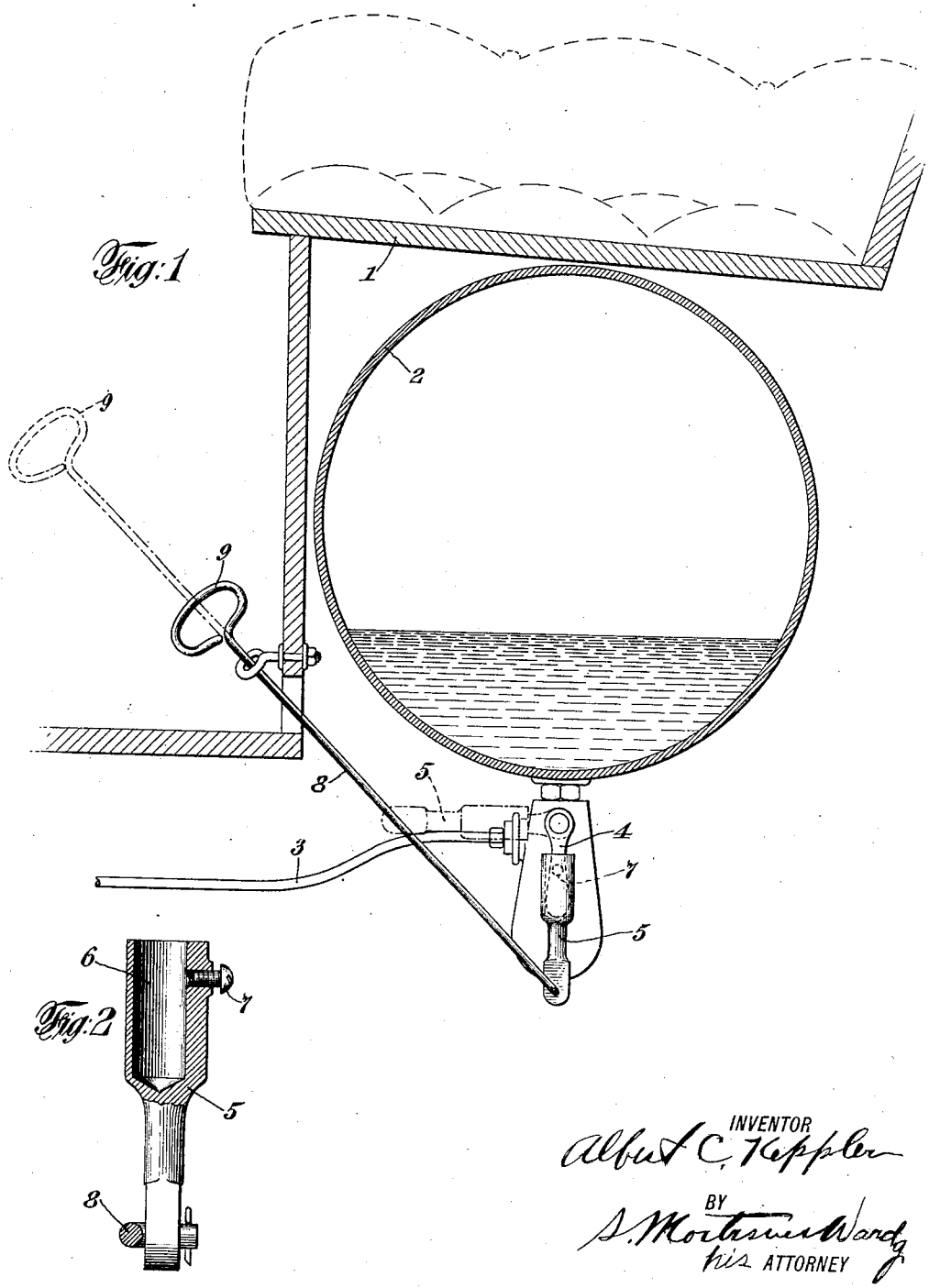

ALBERT C. KEPPLER, OF NEWBURGH, NEW YORK, ASSIGNOR TO SUNDERMAN CORPORATION, OF NEWBURGH, NEW YORK, A CORPORATION OF NEW YORK.

AUTOMOBILE GASOLENE-SHUT-OFF APPARATUS.

1,389,876. Specification of Letters Patent. Patented Sept. 6, 1921.

Application filed April 4, 1918. Serial No. 226,631.

*To all whom it may concern:*

Be it known that I, ALBERT C. KEPPLER, a citizen of the United States, residing at Newburgh, in the county of Orange and State of New York, have invented certain new and useful Improvements in Automobile Gasolene-Shut-Off Apparatus, of which the following is a specification.

The invention relates to automobile gasolene shut off apparatus. The main object of the invention is to provide an apparatus by means of which the stop cock of a gasolene tank located beneath the seat of an automobile may be conveniently operated by the operator on the seat and which apparatus is easily applied and is detachable.

Further and more specific objects, features and advantages will more clearly appear from the detail description given below taken in connection with the accompanying sheet of drawings which forms a part of this specification.

In the drawings Figure 1 is a vertical section through an automobile seat and gasolene tank therebeneath and showing an apparatus embodying the invention in its preferred form applied thereto. Fig. 2 is a detail, partly in vertical section, of the member for attaching the apparatus shown in Fig. 1.

Referring to the drawings 1 represents the seat of a gasolene automobile having any suitable gasolene engine for driving the same. 2 indicates a gasolene tank located beneath the seat 1 and having an outlet in its bottom connecting with a conduit 3 which leads to the carbureter of the engine. Adjacent the outlet of the tank, the conduit 3 is provided with a stop cock having a stop cock lever 4, operation of which is adapted to open and close the stop cock to permit and shut off respectively the flow of gasolene through the conduit 3.

Removably secured to the lever 4 is an attaching member 5 having an eccentric bore in one end at 6 so that one side is thicker than the other as shown in Fig. 2. The recessed part 6 is adapted to fit over the lever member 4 and a set screw 7 is provided operating through the thick side of the member 5 and engaging the lever member 4 so as to secure the member 5 rigidly to the lever 4.

At its opposite end the member 5 has pivotally connected to it a link 8 extending upwardly to a point adjacent the seat 1 where it can be conveniently operated by the operator on the seat 1. At its upper end the link 8 is provided with a handle portion 9.

When the parts are in the position shown in full lines in Fig. 1 the stop cock is opened so as to permit gasolene to flow from the tank 2 through the conduit 3 to the carbureter. When it is desired to shut off the flow of gasolene at the tank the operator, without leaving the seat, conveniently pulls upwardly the link 8 in a direction longitudinally of the link, so that the parts assume the position shown in dotted lines in Fig. 1 when the stop cock will be closed to shut off the flow of gasolene from the tank and through the conduit 3. The stopcock may be again opened by pushing the link down in a direction longitudinally of the link.

Although I have described my improvements in great detail and with respect to an apparatus embodying the same in the preferred form, it will be understood that the invention is not limited to such details and form, since many changes and modifications may be made and the invention embodied in widely differing forms without departing from the spirit and scope of the invention in its broader aspects. For example the pivotal connection of the link 8 with respect to the lever 4 may be accomplished in a variety of ways. However, having fully and clearly explained my improvements, and the preferred manner of carrying them into effect, what I claim as new and desire to secure by Letters Patent, is:

1. In an automobile having a seat, the combination of a gasolene tank beneath the seat, a conduit leading from said tank, a stop cock and its lever for said conduit, adapted to shut off the flow of gasolene through said conduit, with a member detachably secured to said stop cock lever and a link pivotally secured to said member and extending upwardly to a point adjacent said seat whereby the same may be conveniently operated by the operator from the said seat to open and close said stop cock and adapted to operate said stopcock when pulled or pushed in a direction longitudinally of the link.

2. In an automobile having a seat, the combination of a gasolene tank, a conduit leading from said tank, a stop cock and its lever adapted to shut off the flow of gasolene through said conduit, with a link pivotally secured with respect to said stop cock lever to operate the same, but detachable therefrom and extending upwardly to a point adjacent said seat whereby the same may be conveniently operated by the operator from the said seat to open and close said stop cock and adapted to operate said stopcock when pulled or pushed in a direction longitudinally of the link.

3. A device for operating the gasolene stop cock of a gasolene tank located beneath the seat of an automobile, comprising a member recessed to receive or fit over the stop cock lever, a screw operating in said member to firmly secure the member to the stop cock lever and a link pivotally connected to said member and adapted to extend upwardly and be operated by the operator on said seat to open and close the stop cock and adapted to operate said stopcock when pulled or pushed in a direction longitudinally of the link.

4. A device for operating the gasolene stop cock of a gasolene tank of an automobile, comprising a member recessed to receive or fit over the stop cock lever arm extending at right angles to the body portion of the stopcock, a screw operating in said member to firmly secure the member to the stop cock lever arm and a link pivotally connected to said member and adapted to extend upwardly and be operated by the operator in the automobile to open and close the stop cock, the recess in said member being eccentrically arranged to provide a relatively thick side through which said screw operates, and said link having a handle on its upper end and adapted to operate said stopcock when pulled or pushed in a direction longitudinally of the link.

In testimony whereof, I have signed my name to this specification.

ALBERT C. KEPPLER.